G. SYKES.
ARTICLE OF MANUFACTURE.
APPLICATION FILED OCT. 16, 1918.
1,391,428.
Patented Sept. 20, 1921.
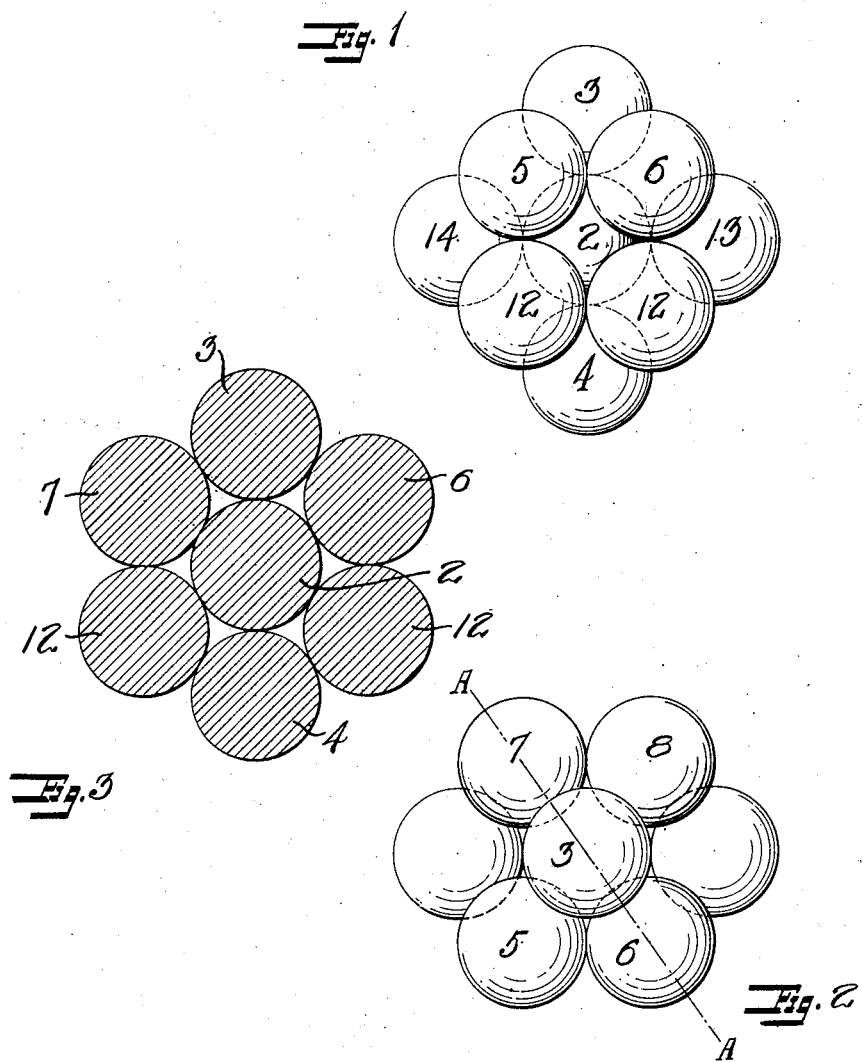
WITNESS
J. B. Gardner.
INVENTOR
GEORGE SYKES
BY White Prost
HIS ATTORNEYS

UNITED STATES PATENT OFFICE.

GEORGE SYKES, OF PENRYN, CALIFORNIA.

ARTICLE OF MANUFACTURE.

1,391,428.  Specification of Letters Patent.  Patented Sept. 20, 1921.

Application filed October 16, 1918. Serial No. 258,330.

*To all whom it may concern:*

Be it known that I, GEORGE SYKES, a citizen of the United States, and a resident of Penryn, county of Placer, and State of California, have invented a certain new and useful Article of Manufacture, of which the following is a specification.

The invention relates to a formation of spherical objects.

An object of the invention is to provide an article composed of spherical objects in contact which may be employed as a spinning top, as a unit for building construction, as an agitator for air or liquids, and for other purposes.

The invention possesses other advantageous features, some of which, with the foregoing, will be set forth at length in the following description where I shall outline in full that form of the invention which I have selected for illustration in the drawings accompanying and forming part of the present specification.

In said drawings:

Figure 1 is a side elevation of the article of my invention.

Fig. 2 is a top or plan view.

Fig. 3 is a section on the line A—A, Fig. 2.

The article consists of a plurality of spherical objects, preferably solid, arranged in a cluster, so that each object is in contact with at least four other objects. The objects are preferably all of the same diameter and are cemented or otherwise fastened together at their contacting surfaces, the interstices between the objects forming passages through the cluster or formation.

The cluster may be formed of thirteen spherical objects, consisting of a central object 2 and twelve objects grouped around and in contact with the central object. The surrounding objects are arranged symmetrically with respect to the central object, so that the formation is symmetrical about a central axis. Arranged above and below the central object 2 are the objects 3 and 4. Surrounding the juncture of the objects 3 and 2 and contacting therewith are the four objects 5, 6, 7 and 8, the objects 5 and 6 being in contact and the objects 7 and 8 being in contact. Surrounding the juncture of the objects 2 and 4 and contacting therewith are the four objects 12 arranged in the same relation as the objects 5, 6, 7 and 8, and each being in contact with the corresponding objects 5, 6, 7 or 8 in the group above. The centers of the objects 5, 6, 7 and 8 lie in the horizontal plane passing through the point of contact of the objects 3 and 2, and the centers of the objects 12 lie in the horizontal plane passing through the point of contact of the objects 2 and 4. Contacting with the objects 2, 6, 7, 12, 12 is an object 13 and arranged opposite thereto is an object 14 contacting with the objects 2, 5, 7, 12, 12. Each object in the cluster contacts with the central object and with four other objects, thereby making a homogeneous mass. When desired, the central object 2 may be omitted to produce a chamber at the center of the cluster.

The formation is such that each two diametrically opposite bodies of the surrounding group, such as 3—4 or 13—14 or 5—8, project from the planes of the surrounding objects so that the article may be spun on any object. Since this condition obtains, the article is particularly adapted to be used as a spinning top since if given a rotating movement on a surface it will spin on one object. The objects are spherical, so that contact with the surface is effected with a minimum of friction and due to the displacement of the mass from the center of rotation, the momentum of the article is great and it continues in rotation for comparatively long times. The spherical objects may be of different colors, so that color bands are produced as the article spins and by spinning the article on different objects, different color bands are produced, presenting a novel optical illusion.

The article also has other uses. For instance, it may be arranged on a shaft and rotated to produce agitation of air or liquid without producing currents of the air or liquid. It may be used as a unit for masonry building construction.

The objects instead of being cemented or otherwise secured together, may be removably held in a cluster by elastic bands encircling the six objects which lie in one plane, as shown in Fig. 3. The objects are preferably made of glass or enameled clay, and may comprise toy marbles.

I claim:

1. An article of manufacture, comprising a system of groups of spherical objects attached to form a combined article, each object being so disposed that it has a contactual relation with at least four others in a group of which it forms a part.

2. An article of manufacture, comprising a system of groups of like spherical objects all connected and in symmetrical arrangement about a common center so that each object forms one of a group, each object connected to a center and similar object in the system and lying in a diametrical line through the center object and through another object on the opposite side thereof.

In testimony whereof, I have hereunto set my hand at San Francisco, California, this 8th day of October, 1918.

GEORGE SYKES.

In presence of—
H. G. Prost.